United States Patent [19]
Stang et al.

[11] Patent Number: 5,908,182
[45] Date of Patent: Jun. 1, 1999

[54] ADJUSTABLE AND FOLDABLE SUPPORT STRUCTURE

[76] Inventors: Michael N. Stang, 6152 Somerville Valley Rd., Ellicottville, N.Y. 14731; David L. Molitor, 26404 County Rd., #50, Cold Spring, Minn. 56320

[21] Appl. No.: 08/801,860

[22] Filed: Feb. 18, 1997

Related U.S. Application Data

[60] Provisional application No. 60/012,034, Feb. 21, 1996.

[51] Int. Cl.$^6$ .................................................. F16M 11/24
[52] U.S. Cl. ...................................... 248/188.2; 248/188.6
[58] Field of Search ............................ 182/182.1, 182.4, 182/182.5, 227, 224, 225, 45; 211/195, 199, 200; 248/167, 188.2, 188.6, 436, 434, 148; 282/224, 225; 269/900, 901

[56] References Cited

U.S. PATENT DOCUMENTS

| | | |
|---|---|---|
| Re. 30,020 | 6/1979 | Spencer et al. . |
| 574,486 | 1/1897 | Jones . |
| 1,175,522 | 3/1916 | Horn ...................................... 182/227 |
| 1,476,855 | 12/1923 | Topp . |
| 1,576,583 | 3/1926 | England . |
| 2,602,008 | 7/1952 | Hasselbring . |
| 2,635,013 | 4/1953 | Doucette . |
| 2,664,319 | 12/1953 | Doucette . |
| 2,829,927 | 4/1958 | Sword . |
| 2,947,378 | 8/1960 | Brynjolfsson .................... 182/182.4 X |
| 3,065,982 | 11/1962 | Dodd .................................... 248/410 X |
| 3,167,290 | 1/1965 | Beckwell . |
| 3,443,662 | 5/1969 | Thompson . |
| 3,934,676 | 1/1976 | Rice ................................. 182/182.4 X |
| 3,951,233 | 4/1976 | Meyers . |
| 4,014,404 | 3/1977 | Jackson . |
| 4,207,966 | 6/1980 | Aubin et al. . |
| 4,278,148 | 7/1981 | Daley et al. . |
| 4,508,194 | 4/1985 | Freewalt et al. .................... 182/225 X |
| 4,804,064 | 2/1989 | Coultrup et al. . |
| 5,184,697 | 2/1993 | Crewe et al. ....................... 182/225 X |

*Primary Examiner*—Ramon O. Ramirez
*Assistant Examiner*—Robert Lipcsik
*Attorney, Agent, or Firm*—James C. Simmons

[57] ABSTRACT

A portable sawhorse or other apparatus such as a sign stand or a table providing support. The sawhorse comprises first and second frames each having a pair of legs, a third frame having first and second elongate vertical portions to which the first and second frames respectively are connected A support structure is connected to the upper ends of the vertical portions The height of each end of the sawhorse is independently adjustable so that the support structure may be level on hilly terrain. The first and second frames are rotatable relative to the vertical portions respectively so that the sawhorse may be folded to a narrow or "thin" configuration with all of the legs coplanar for ease of stowage and transport A platform is mountable on the sawhorse, and lumber is supportable off of each end of the platform for mitering thereof.

18 Claims, 13 Drawing Sheets

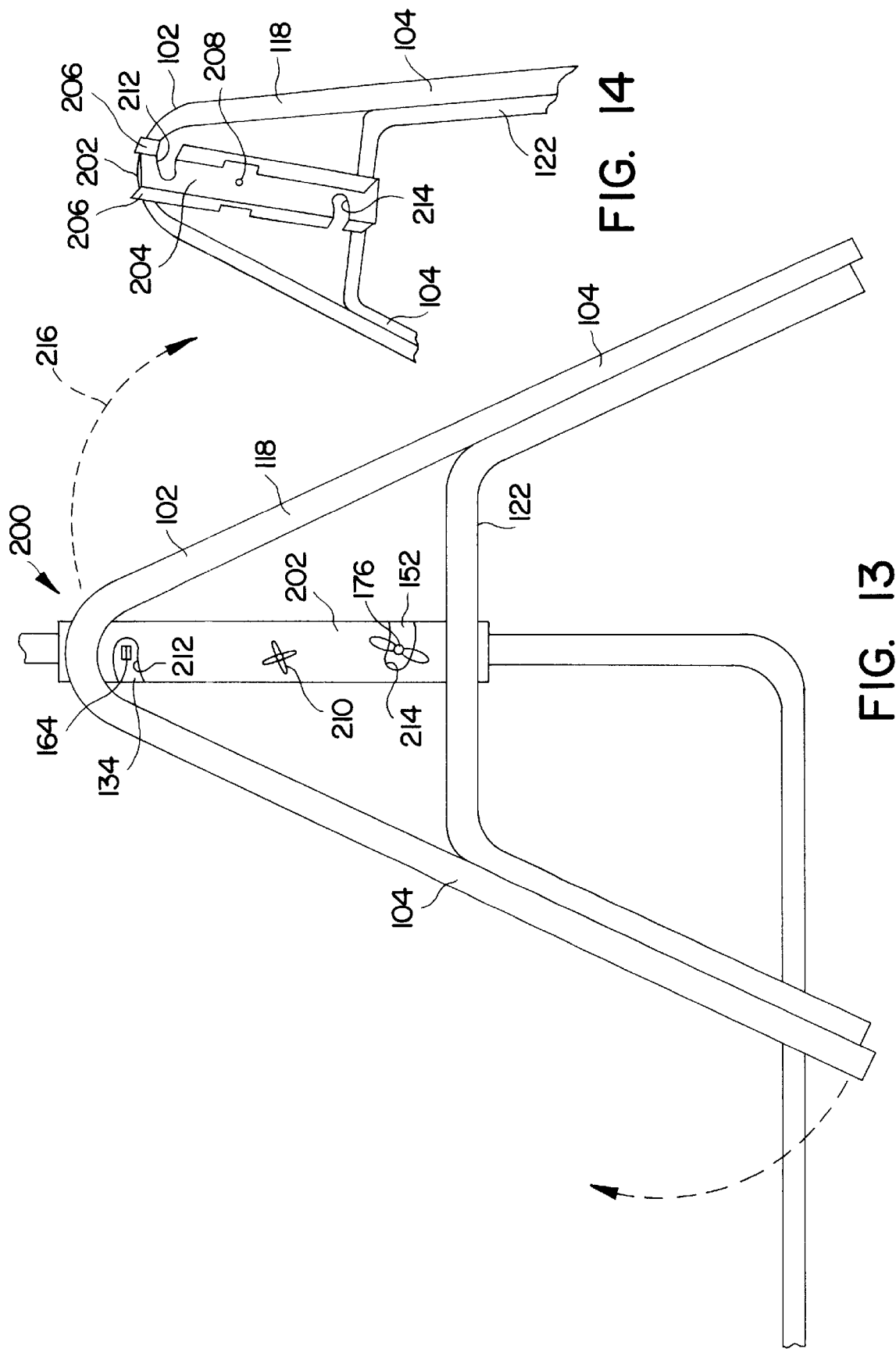

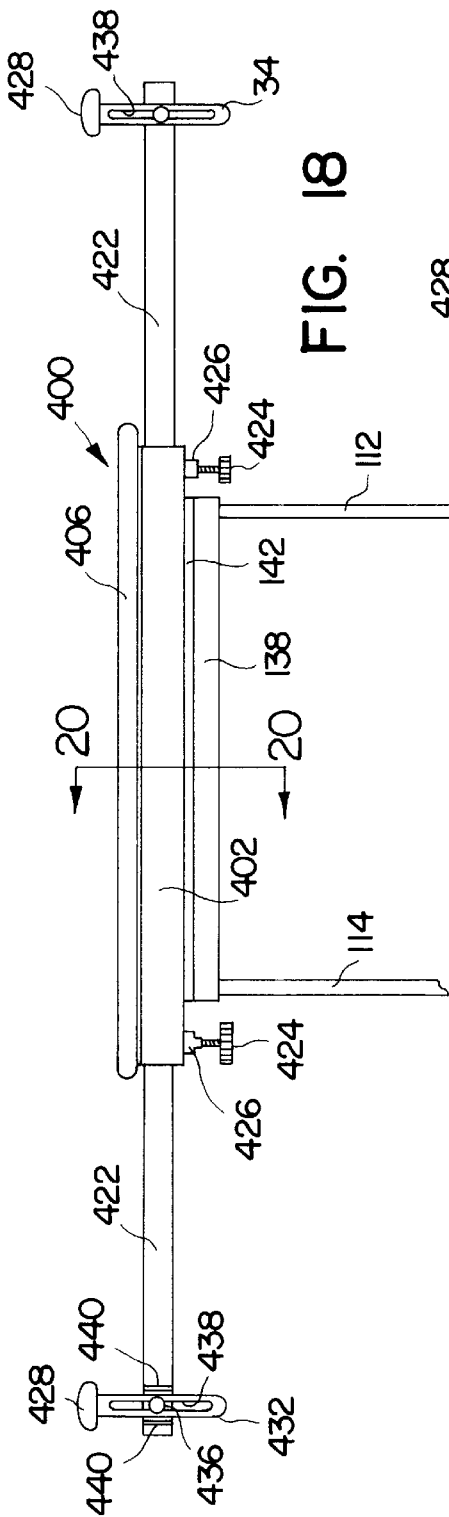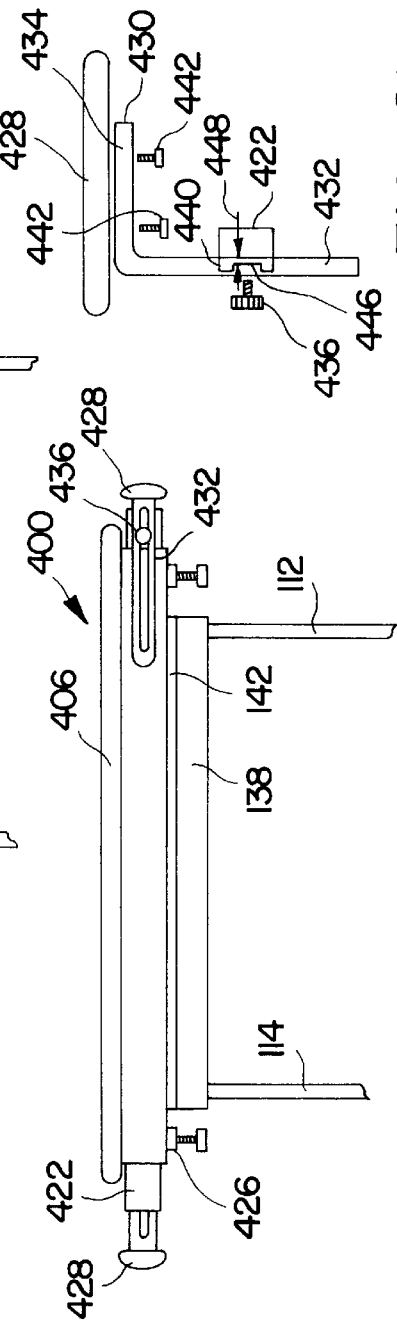

ADJUSTABLE AND FOLDABLE SUPPORT STRUCTURE

Priority of co-pending provisional application 60/012,034, filed Feb. 21, 1996, is hereby claimed.

The present invention relates generally to supports for workpieces, commonly known as sawhorses, or for other kinds of supports such as road-side sign stands, portable tables, and the like.

Typically, as seen in U.S. Pat. No. 4,278,148, a sawhorse may include a wooden stringer to which is connected a metal stringer, and two A-frames each including a pair of outwardly sloping legs and connected to the metal stringer.

U.S. Pat. Re. No. 30,020 (of U.S. Pat. No. 4,031,981) discloses a work platform which has replaceable wooden inserts for the working surfaces thereof. The platform includes an H-shaped base to which a scaffold is mounted so that it is height adjustable. The base includes a pair of legs which are formed from hollow metal tubes welded to a horizontal crosspiece. Lateral stability for the base is provided by a support stand which is also formed of hollow tubular material and which includes another pair of legs. The support stand is rotatably and extensibly coupled to the crosspiece by means of a hollow sleeve which is welded to the crosspiece and which telescopically receives a neck which extends upwardly from the support stand midway between the legs thereof. It is stated in this patent that, on uneven ground, the stand may be extended into ground engagement so that the stand and one of the base legs will maintain the platform upright even if one of the other base legs does not touch the ground.

U.S. Pat. No. 3,167,290 discloses a collapsible support which is adjusted as to height by adjusting brace rods relative to and along a ridge bar. Looseness of the connections of the legs, brace rods, and tie bars permits the legs to adjust their positions relative to a supporting surface, such position variations being absorbed by an ability of the ridge bar to twist the amount necessary so that all four legs will rest upon the surface.

Other art showing collapsible and/or adjustable sawhorses or the like includes U.S. Pat. No. 574,486; 1,476,855; 1,576,583; 2,602,008; 2,635,013; 2,664,319; 2,829,927; 3,951,233; 4,014,404; 4,207,966; 4,278,148; and 4,804,064.

None of the above patents discloses a sawhorse which is suitably adjustable for unlevel terrain so that the work surface is level.

It is accordingly an object of the present invention to provide a sawhorse which is usable on unlevel terrain with the work surface remaining level.

It is another object of the present invention to easily and quickly fold the sawhorse to a "thin" configuration for easy stowability such as, for example, behind the back seat of a pickup truck.

It is a further object of the present invention to make such a sawhorse inexpensively yet sturdy and rugged.

In order to provide a sawhorse which is usable on unlevel terrain with the work surface remaining level, in accordance with the present invention, a first frame has a first pair of legs, a second frame has a second pair of legs, and a third frame to which the supporting or work surface is attached has a pair of elongate portions to which the first and second frames are attached respectively. The distance which one or both of the elongate portions extends above the respective one of the first and second frames is adjustable so that the height of each end of the work surface above the terrain may be adjusted independently. Further, the first and second frames are rotatable relative to the respective elongate portions so that all four legs may be brought into position to lie in a common plane to provide a "thin" configuration for easy storage of the sawhorse.

The above and other objects, features, and advantages of the present invention will be apparent in the following detailed description thereof when read in conjunction with the accompanying drawings wherein the same reference numerals denote the same or similar parts throughout the several views.

BRIEF DESCRIPTION OF THE DRAWINGS

FIG. 13 is a partial side elevation view of another embodiment of the sawhorse with the frame containing a pair of legs rotated about a vertical plane to achieve a "thin" configuration.

FIG. 14 is a partial perspective view of the pair of legs for the sawhorse of FIG. 13.

FIG. 18 is a side view of a miter saw platform structure, in accordance with the present invention, mounted on the sawhorse of FIG. 8 and unfolded for use.

FIG. 19 is a view similar to that of FIG. 18 of the platform structure in a folded up configuration.

FIGS. 21, 22, and 23 are detail views of the platform structure.

DETAILED DESCRIPTION OF THE PREFERRED EMBODIMENT

Figure 1:
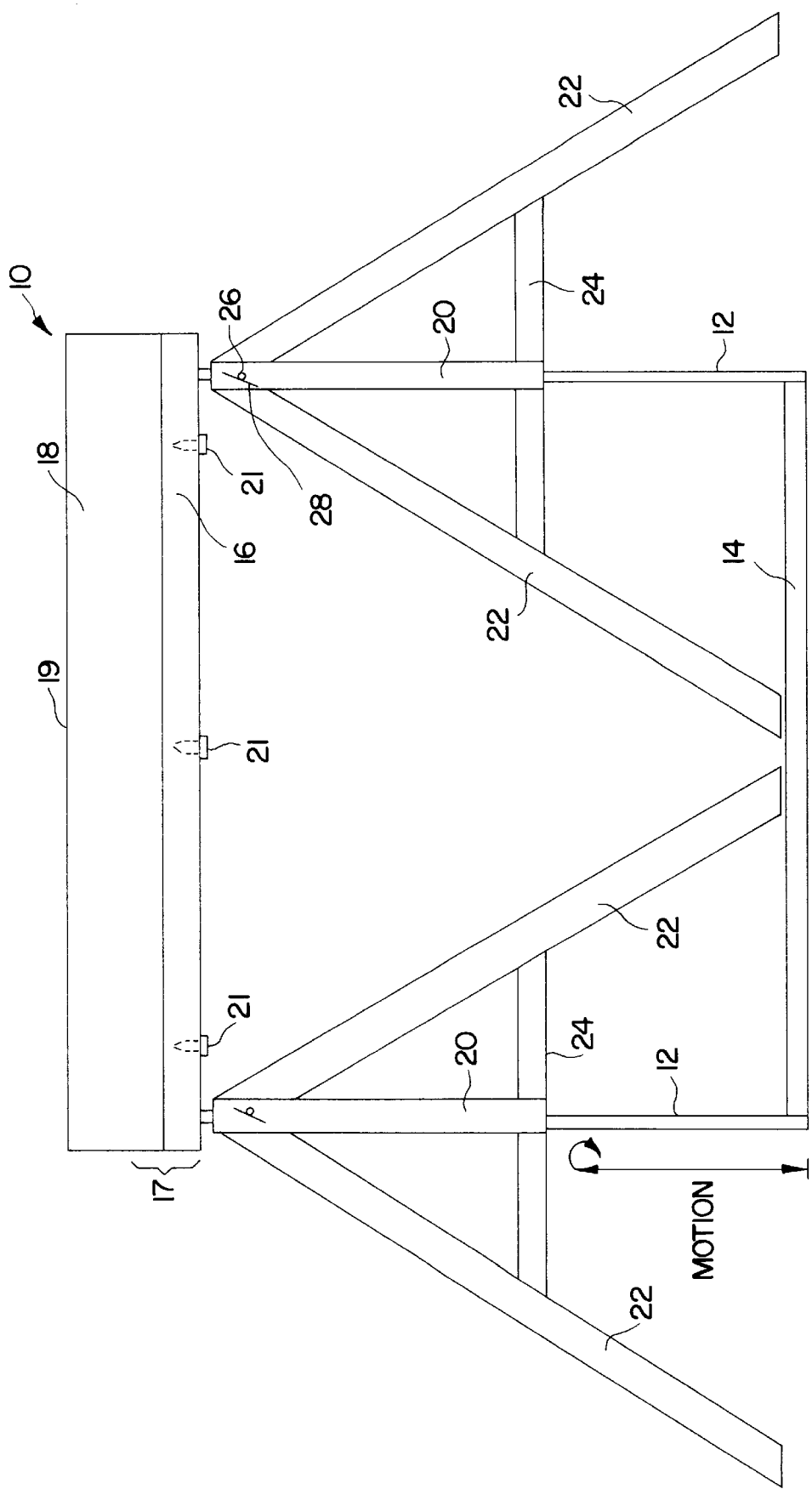
FIG. 1 is a side elevation view of a sawhorse, in folded configuration, which embodies the present invention.

Referring to the drawings, there is shown generally at 10 a sawhorse, i.e., a support for lumber or other workpieces. The sawhorse 10 comprises a frame structure including a pair of cylindrical vertical frame members 12 to the bottom ends of which is welded or otherwise suitably attached an angle iron 14. A workpiece support structure 17 providing a surface 19 for receiving a workpiece is suitably attached to the tops of the frame members 12. Support structure 17 includes a support member 18 composed of wood or other suitable material and a member 16 which is welded or otherwise suitably attached to the top ends of members 12. The member 16 may be an upwardly-facing channel composed of metal for slidably receiving the removable wood support 18. The support member 18 may be removably attached to the channel 16 by screws, illustrated at 21. The support member 18 may suitably be a 2"×4" piece and have a length of perhaps about 32 inches. However, the sawhorse may have any other suitable sizing.

The frame members 12 are received in tubes 20 respectively for movement of the tubes 20 up and down the lengths of the frame members 12. Welded or otherwise suitably attached to the upper ends of each of the tubular members 20 are a pair of supporting tubular legs 22 which extend from opposite sides of the respective tube 20. The two legs of each pair of legs lie in a common plane. A brace 24 is welded or otherwise suitably attached to each pair of legs 22 (intermediate their ends) and to the lower end of the respective tube 20.

Figure 4:
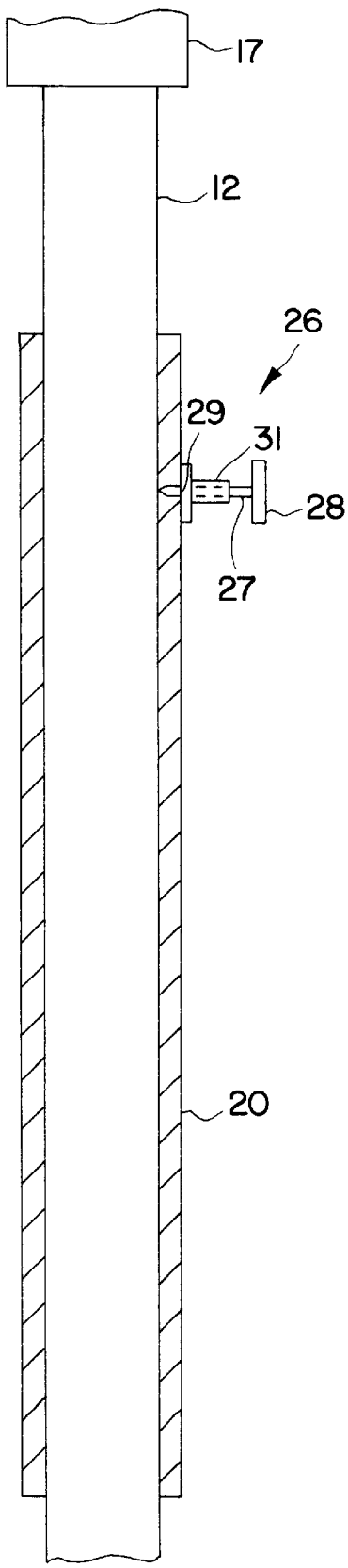
FIG. 4 is a partial view thereof illustrating a means for adjusting the sawhorse height and for folding thereof.

The tubes 20 are adjustably slidable along the lengths of the frame members 12 respectively and adjustably rotatable thereabout and are locked in desired positions by suitable locking mechanisms 26, which are shown in FIG. 4 to each comprise a set screw 27 with a handle 28 attached and engaging a threaded aperture 29 through the wall of the respective tube 20 (by means of a welded nut 31, as shown in FIG. 4, or tapped hole) for frictionally pressing the tube 20 and respective frame member 12 together, wedging them in position. Other suitable locking mechanisms may be provided, and examples thereof are described hereinafter with reference to FIGS. 5, 6, and 7.

Figure 2:
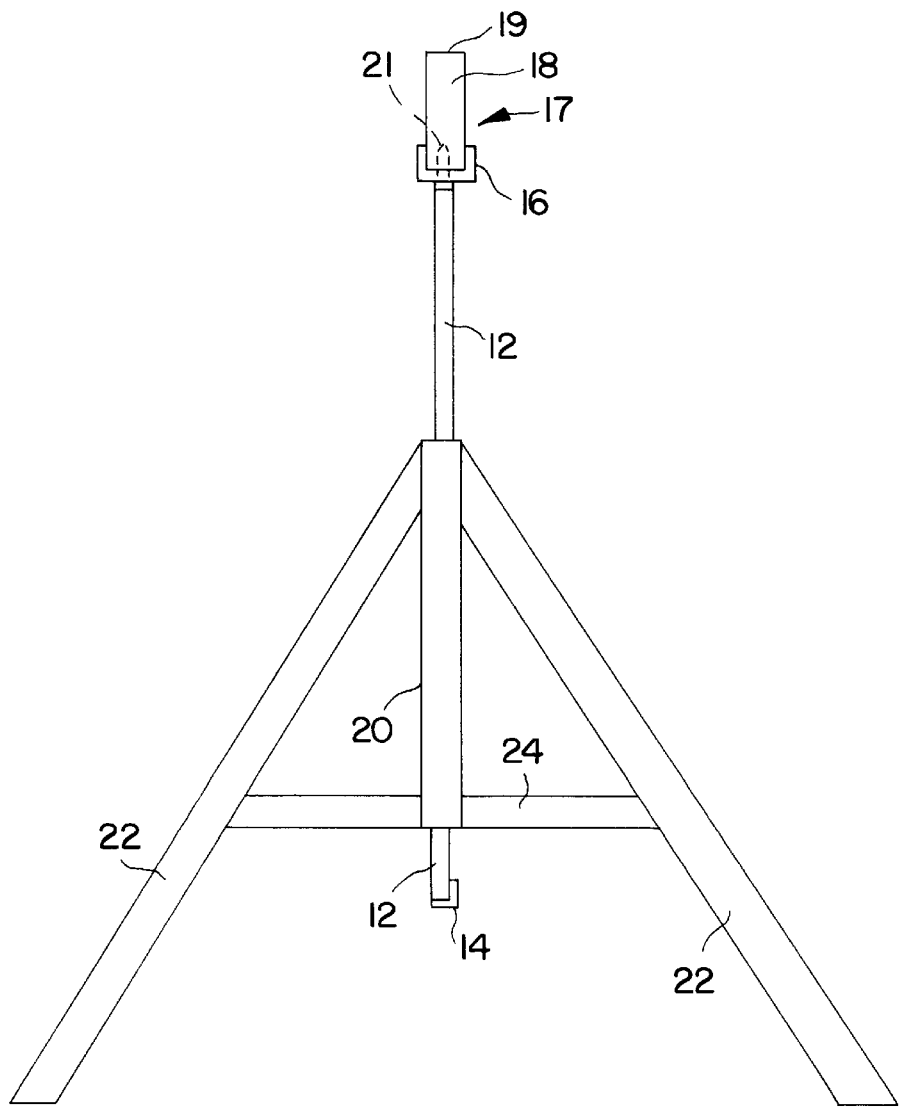
FIG. 2 is an end elevation view thereof in an unfolded configuration for use.

When the tubes 20 are rotated to the positions shown in FIG. 1, the four legs 22 are generally in a common plane with the frame members 12 and 14 and the support 17 so that the sawhorse is folded to a "thin" configuration for easy stowability such as, for example, behind the back seat of a pick-up truck, or hanging on a wall, or stowing under a work bench. For use, the legs 22 are swung around 90 degrees, as shown in FIG. 2.

The height of the sawhorse 10 may be adjusted by raising or lowering the tubes 20 on the frame members 12 respectively. FIG. 1 shows the sawhorse 10 with the workpiece surface 19 at the lowest height.

Figure 3:
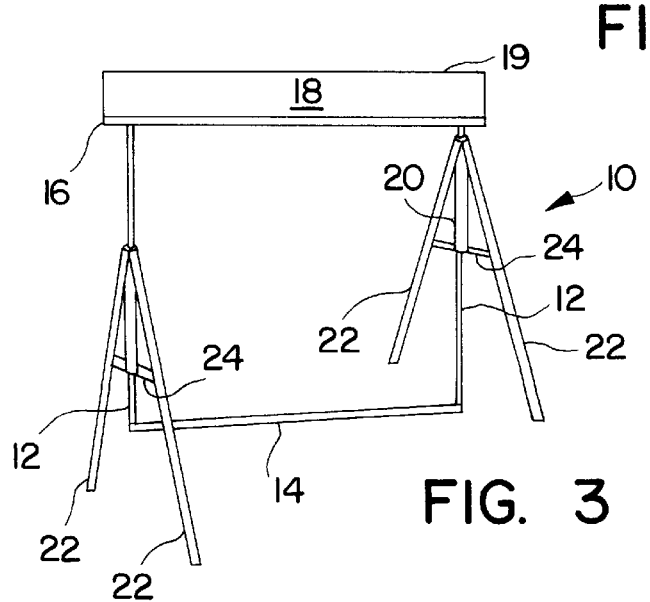
FIG. 3 is a perspective view illustrating the sawhorse in an unfolded configuration and resting on unlevel terrain.

FIG. 3 shows the tubes 20 at different heights or locations along the lengths of the frame members 12 to adjust for ground slope, i.e., so that the sawhorse 10 may be set-up on a hillside, as shown in FIG. 3, with the support surface 19 being level. Thus, one tube 20 may be positioned near the top of its frame member 12, and the other tube 20 may be positioned near the bottom of its frame member.

The sawhorse 10 may be otherwise suitably built such as of cast aluminum, to eliminate welding and fabrication, or of high density plastic, so that it may be less expensive and lighter for a homeowner. The sawhorse 10 may be suitably equipped with vices, rollers on the top surface 19, a tool tray hanging on the side, and the like. A pair of the sawhorse may of course be used together.

Figure 5:
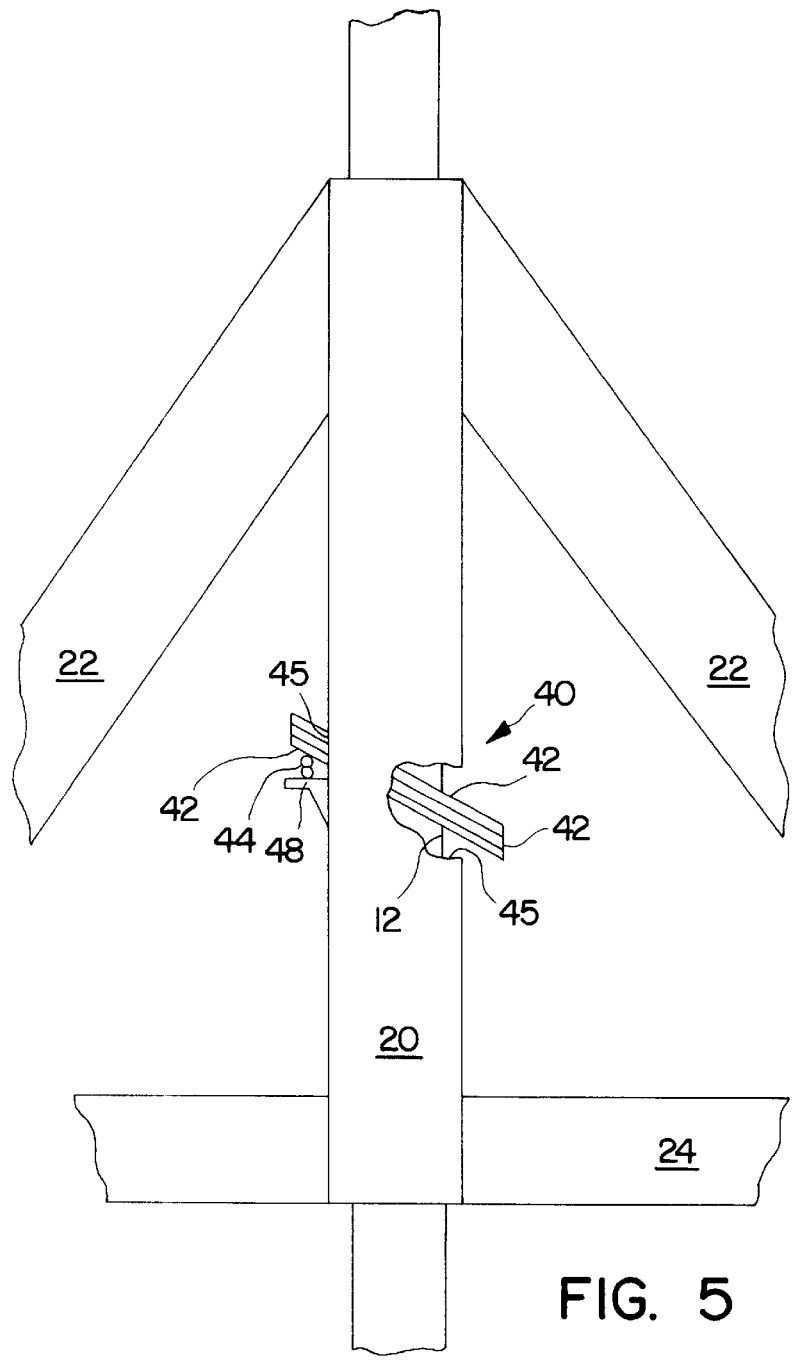
FIG. 5 is a view similar to that of FIG. 4 illustrating an alternative adjusting and folding means therefor.
Figure 6:
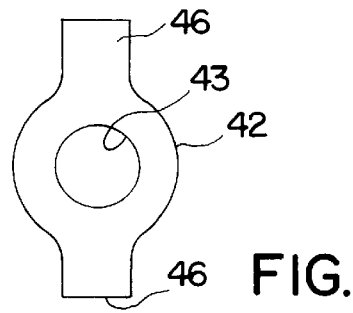
FIG. 6 is a plan view of a washer for the embodiment shown in FIG. 5.

FIGS. 5 and 6 illustrate generally at 40 an alternative adjusting and folding means to that shown in. FIG. 4 for a sawhorse having a cast aluminum or other suitable cast frame structure. Such a means includes a stack of perhaps three washers 42 each having a pair of diametrically opposite projecting portions 46 for engagement by one's fingers and by a spring 44 respectively. Each washer 42 has an aperture 43 which receives the respective frame member 12, and the stack is received within the tube 20, and the projecting portions 46 extend through diametrically opposed cut-outs 45 in the tube 20 to support the respective tube 20. The lower end of the spring 44 is received on a knob or nipple (not shown) on a ledge 48 which extends laterally from the tube 20. A similar knob extends downwardly from the lower washer 42 for receiving the other end. The spring 44 applies a force to the underside of the lower washer 42 to effect pinching of the washers 42 relative to the frame member 12 to clamp the tube 20 to the frame member 12 when the weight of the frame containing tube 20 is pushing down. Alternatively, instead of spring 44, a spring may be provided underneath the lower washer to surround the frame member 12. To adjust the tube position, weight of the frame containing tube 20 is removed and the stack of washers 42 is urged against the spring slightly toward a horizontal position whereby the tube 20 is slidable and rotatable relative to frame member 12.

Figure 7:
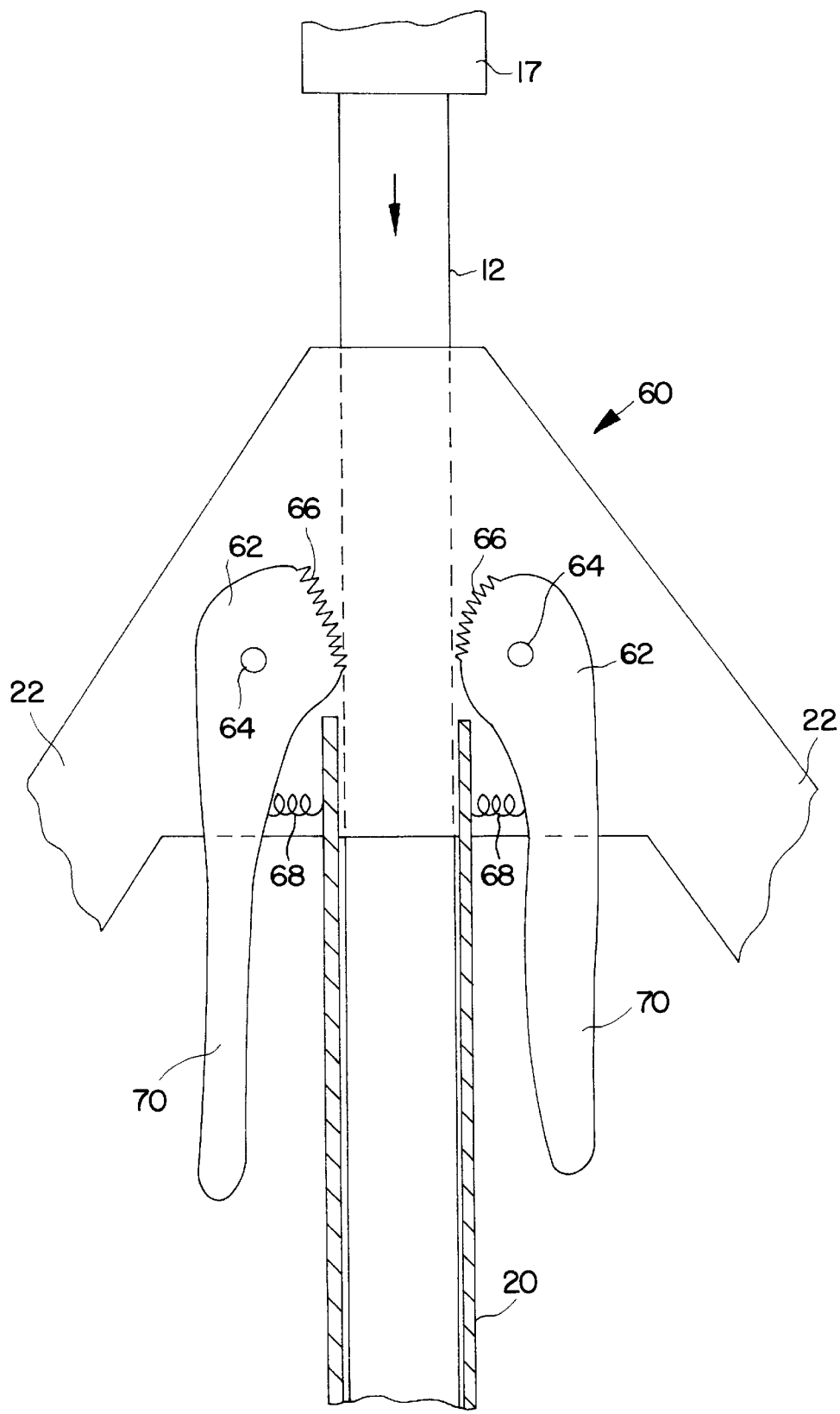
FIG. 7 is a view similar to that of FIG. 4 illustrating another alternative adjusting and folding means therefor.

FIG. 7 illustrates at 60 another alternative adjusting and folding means wherein the frame member 12 is wedged between two cams 62 which are pivotally joined to the legs 22 by pins 64, The cams 62 have serrated surfaces or teeth 66 which engage the frame member 12 and are held in such engagement by springs 68, which provide constant tension to bias the cam surfaces 66 in engagement with the frame member 12. To release the cams 62, the handles 70 thereof are squeezed toward the tube 20 and each other thereby pulling the cam surfaces 66 away from the frame member 12, allowing the tube 20 to slide freely to another desired position. When the handles are released at the new position, the springs urge the handles outwardly, urging the teeth 66 to again engage the frame member 12 and, in conjunction with the downward pressure, lock the tube 20 in place at the new position.

Referring to FIGS. 8 to 12, there is shown generally at 100 a sawhorse in accordance with an alternative embodiment of the present invention. Sawhorse 100 includes a first frame 102 formed to provide a first pair of coplanar legs 104, a second frame 106 formed to provide a second pair of coplanar legs 108, and a generally U-shaped third frame 110 having a pair of vertical elongate portions 112 and 114 and a horizontal elongate portion 116 extending between the lower ends of the vertical portions 112 and 114. The use of the terms "vertical," "horizontal," "lower," and "upper," as used herein and in the claims, are meant to be with reference to the sawhorse oriented in a normal upright position for use.

Figure 8:
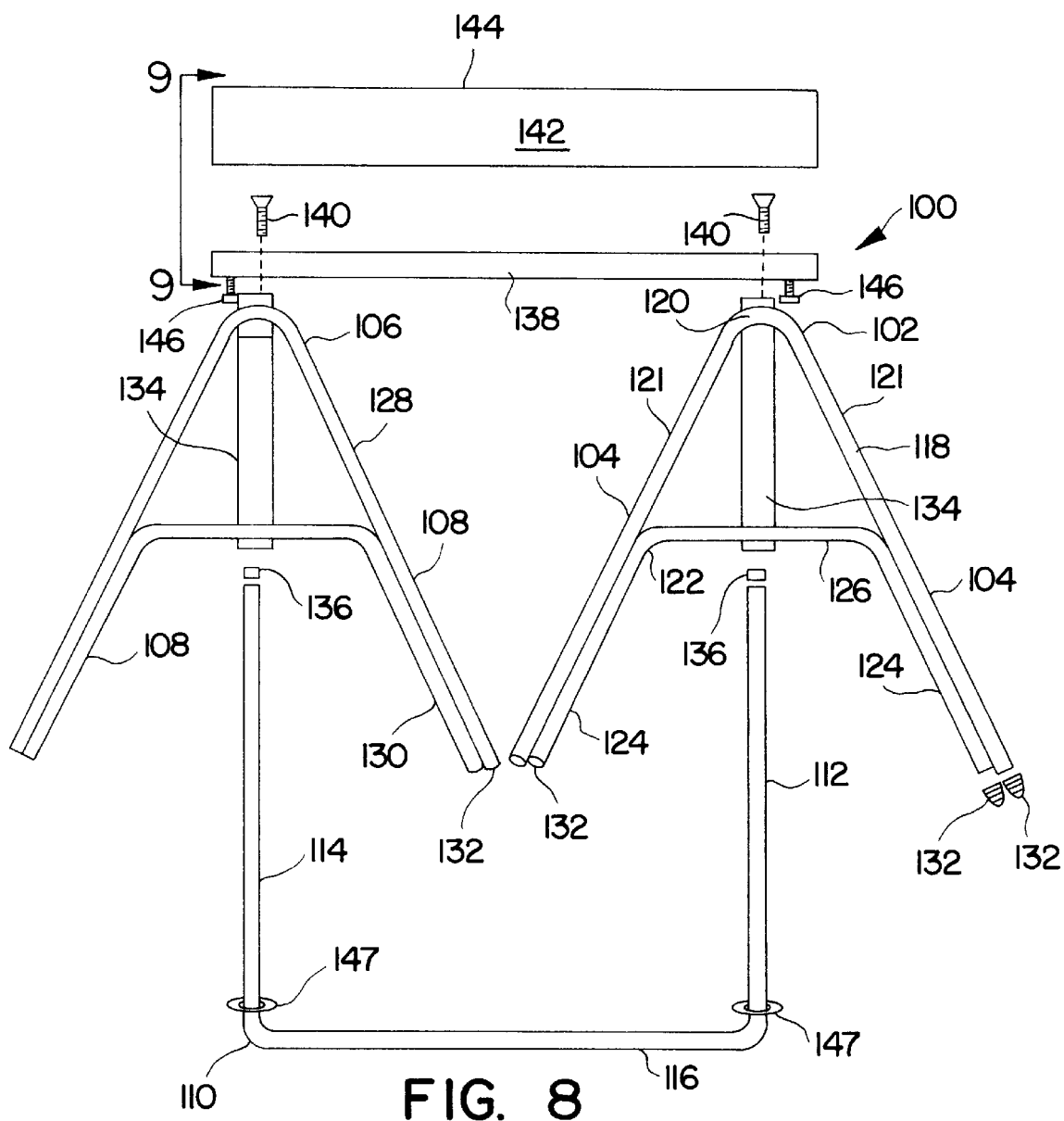
FIG. 8 is an exploded view of an alternative embodiment of the sawhorse.
Figure 9:
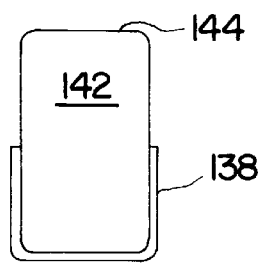
FIG. 9 is an enlarged end view, taken along lines 9—9 of FIG. 8, of the support structure therefor.

In order to minimize production cost while providing a reliable and rugged sawhorse, the frames 102 106, and 110 are preferably formed of tubular stock which, as illustrated in FIG. 8, is bent to the desired shape. The tubular stock may be composed of steel or other suitable material.

First frame 102 has an A-shape and comprises a first tubular member 118 bent at its mid-portion or apex-portion 120 to provide portions 121 which define the legs 104. Frame 102 also comprises a second tubular member 122 bent at two positions to define two leg portions 124 and a middle portion 126 which extends between generally the mid-points of the leg portions 121. Portions 121 and 124 extend alongside each other and are welded or otherwise suitably joined together. Similarly, second frame 106 comprises tubular members 128 and 130, which are similar to tubular members 118 and 122 respectively and which are also welded or otherwise suitably jointed together. The lower ends of tubular members 118, 122, 128, and 130 are provided with, for example, suitably hard rubber plugs 132 or are otherwise suitably fixtured for engaging a floor. A vertical sleeve 134, which is described in greater detail hereinafter, is welded or otherwise suitably attached at its upper end portion to the frame member 118 at its apex-portion 120 and at its lower end portion to the frame member 122 centrally of its middle portion 126. Another sleeve 134 is similarly welded or otherwise suitably attached to the frame members 128 and 130 of second frame 106.

Plugs 136 are welded or otherwise suitably attached in the upper ends of third frame members 112 and 114 thereby closing the ends thereof. The frame members 112 and 114 are slidably received within sleeves 134 respectively, and a generally U-shaped, as seen in end view as in FIG. 9, elongate channel member 138, composed of steel or other suitable material, is suitably attached to the upper ends of the third frame members 112 and 114 such as by screws 140 which are received in apertures (not shown) in the end portions respectively of member 138 and threadedly received in threaded apertures (not shown) in the plugs 136 respectively.

A wood beam 142, which may, for example, be a 2"×4" piece of spruce, is received in the channel 138 and rises above the channel 138 to provide a supporting or work surface 144. The beam 142 is suitably held in position such as by screws 146 which are received in apertures (not shown) in the end portions of the channel 138 and are threadedly received in the lower portion of the beam 142.

Washers 147 are spot-welded on the lower ends of third frame portions 112 and 114 respectfully to act as stops to prevent jamming or wedging of the sleeves 134 at the bends of the third frame 110.

Figure 10:
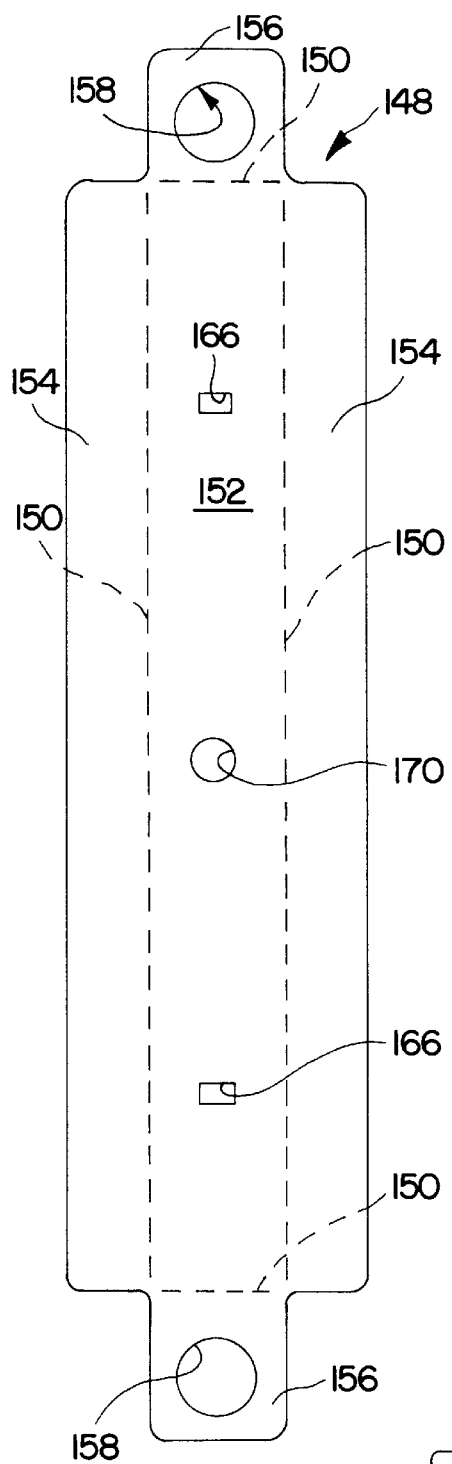
FIG. 10 is a plan view of a blank for forming a sleeve for an elongate portion of the sawhorse of FIG. 8.
Figure 11:
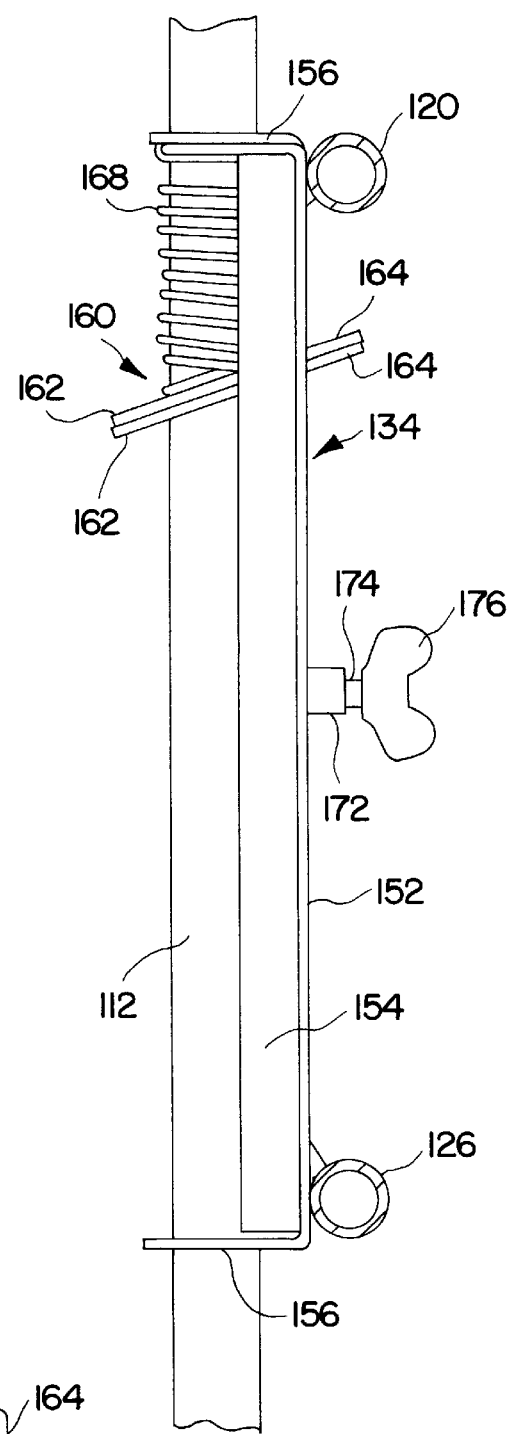
FIG. 11 is a partial view of the elongate portion with the sleeve formed from the blank of FIG. 10 and adjustably attached thereto for height adjustment of a respective pair of legs to which the sleeve is rigidly attached.

Referring to FIGS. 10 and 11, in order to minimize production cost while still providing a reliable and rugged sawhorse, each sleeve 134 is formed by stamping plate steel or other suitable material to form a blank, illustrated at 148, and the blank 148 is pressed to bend the blank 148 along dashed lines 150 to provide a front wall 152, two side walls 154 normal thereto, and upper and lower end walls 156 which are also normal thereto.

Each third frame vertical portion 112 and 114 is received in upper and lower apertures 158 in the respective sleeve end walls 156. Thus, sleeve 134 is shown to only partially surround vertical portion 112. For the purposes of this specification and the claims, a "sleeve" is defined as a part which at least partially surrounds an elongate member or portion. The sleeve and the apertures 158 thereof are sized so that the elongate portion 112 is slidable therein.

Figure 12:
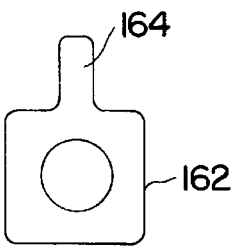
FIG. 12 is a plan view of a washer for the sleeve of FIG. 11 used in such height adjustment.

A quick release mechanism 160 is provided in each sleeve for adjusting the sawhorse height at each end, i.e., adjusting the distance which the respective one of elongate portions 112 and 114 extends beyond the respective one of the frames 102 and 106. This mechanism 160 comprises at least one but preferably 2 or 3 washers 162 which are received on the respective elongate portion 112 or 114. Each washer 162, as seen in FIG. 12, has a tab portion 164 which is received, along with other washer tabs, through a rectangular opening, illustrated at 166, in the upper portion of the sleeve front wall 152. For ease of production, a similar rectangular opening 166 is provided in the lower portion of the sleeve front wall. A spring 168 is mounted to circumscribe the respective frame portion 112 or 114 between the upper end wall 156 and the washers 162.

The spring 168 biases the washers 162 to become canted, as seen in FIG. 11, relative to the respective frame portion 112 or 114 so as to pinch the frame portion, preventing downward movement thereof. By pressing downwardly with one's fingers on the tab portions 164 while relieving the downward force exerted by the respective frame member 102 or 106, the set of washers 162 is movable, against the spring force, to a more horizontal position which allows movement of the sleeve 134 and hence the respective pair of legs relative to the respective frame portion 112 or 114. As soon as the tabs 164 are released, the force of the spring 168 will cant the washers 162 so as to immediately prevent downward movement of the sleeve 134 relative to the respective frame portion 112 or 114. Thus, the height above the terrain of each end of the sawhorse may be easily individually adjustable and then set at the desired height merely by releasing the tabs 164. The frames 102 and 104 are prevented by the washers 162 from falling but may still go up by themselves.

In order to lock each end of the sawhorse at its desired height above the terrain, an aperture 170 is provided in the sleeve front wall 152, a Pem nut or other suitable nut 172 spot-welded at the inside or otherwise suitably attached to the front wall 152 so that its opening (not shown) is aligned with aperture 170, and a screw 174 having a wing-nut 176 threadedly received in nut 172. By turning wing-nut 176, the screw 174 is caused to press against the respective frame portion 112 or 114, applying force between the frame portion and end walls 156, and thereby lock the sawhorse against relative movement between the frame portion 112 or 114 and the sleeve 134.

For quickly folding the sawhorse to a "thin" configuration for stowage and transport such as behind the seat of a pick-up truck, the first and second frames 102 and 106 are rotatable about the respective vertical portions of the third frame so that all four of the legs 104 and 108 are coplanar, i.e., lie in a common plane. The sawhorse 100 may, for example, be sized to adjust to a height of from 26 to 38 inches.

Figure 15:
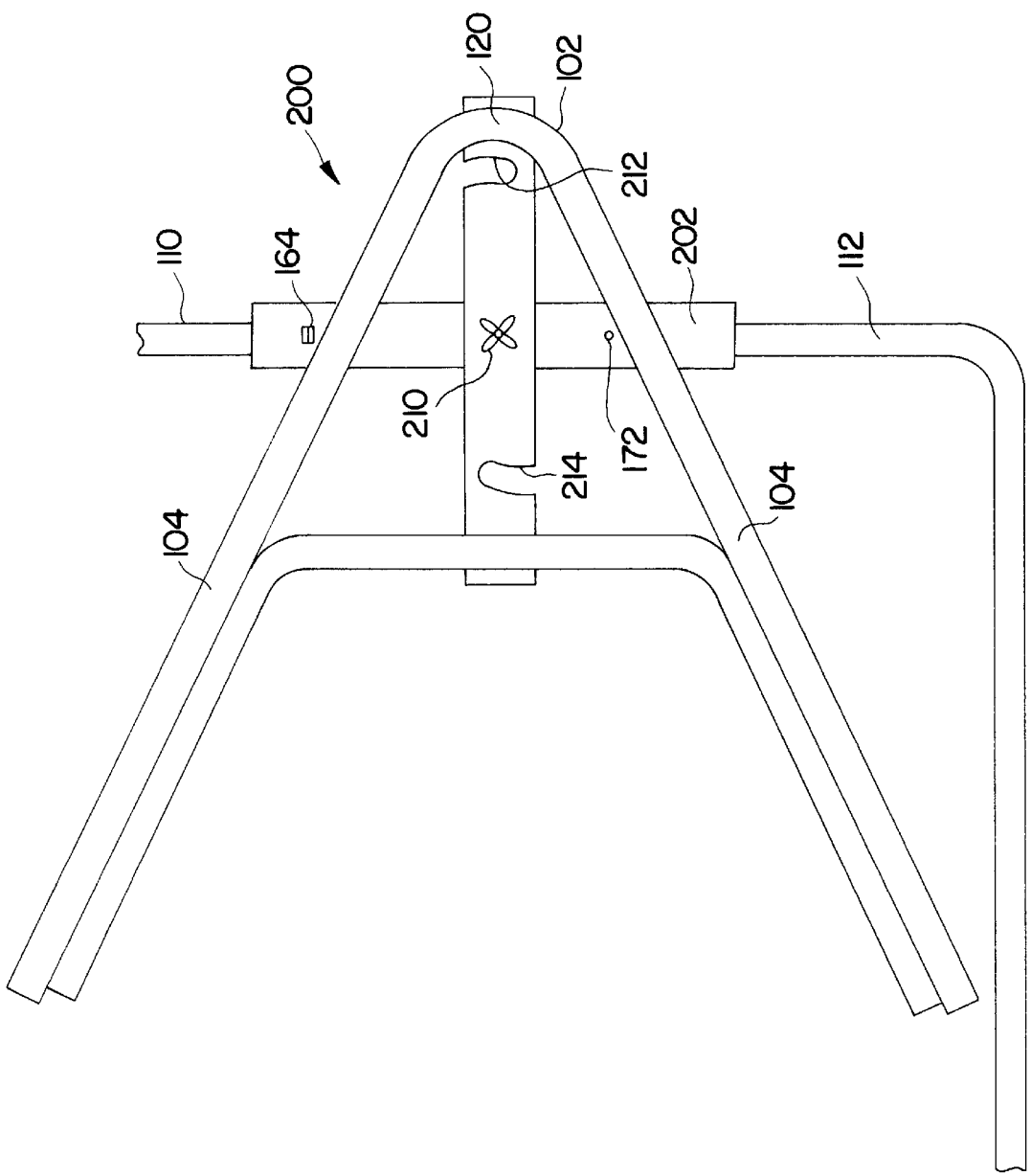
FIG. 15 is a partial side view of the sawhorse of FIG. 13 with the frame containing the pair of legs further rotated about a horizontal plane to achieve a more compact configuration.

Referring to FIGS. 13, 14, and 15, there is illustrated at 200 another embodiment of the sawhorse which allows more compact folding for stowage and transport. Except for the sleeve assembly, the components are similar to those for the sawhorse 100.

In accordance with this embodiment, the sleeve 134 is not directly connected to the respective frame 102 or 106 but is instead indirectly connected by means of a member 202. Member 202 is formed from plate steel to have a front wall 204 which, during use of the sawhorse, lies alongside and covers the sleeve front wall 152 and to have a pair of side walls 206 which lie alongside sleeve side walls 154 respectively so that the member 202 is held in the desired position, as illustrated in FIG. 13, during use of the sawhorse.

Member 202 is welded or otherwise suitably attached at its ends to the members 118 and 122 respectively forming the first frame 102, and another member 202 is welded or otherwise suitably attached at its ends to the members respectively forming the second frame 106.

Centrally thereof, the front wall 204 of member 202 has an aperture 208. An aperture (not shown) is provided in the front wall 152 of sleeve 134, a screw (not shown) inserted therein with the head adjacent the inner surface thereof and the shank protruding outwardly, and the head is welded to the sleeve front wall 152. The screw shank is received in the aperture 208 and is threadedly engaged by a suitable knob 210 so that the member 202 may be tightly secured on the sleeve 134 for use of the sawhorse yet the member 202 may be pivotally moved about the screw shank for reasons which will become apparent Cut-outs 212 and 214 are provided in opposite sides of the member 202 and at opposite end portions thereof for the washer tabs 164 and nut 172 respectively so that the member 202 can be rotated about the pivot at 210 in the direction illustrated at 216.

As seen in FIG. 15, the member 202 and consequently the respective frame 102 or 106 are rotatable through 90 degrees about the pivot at 210 so that the sawhorse may be folded into a more compact assembly for stowage and transport.

Figure 16:
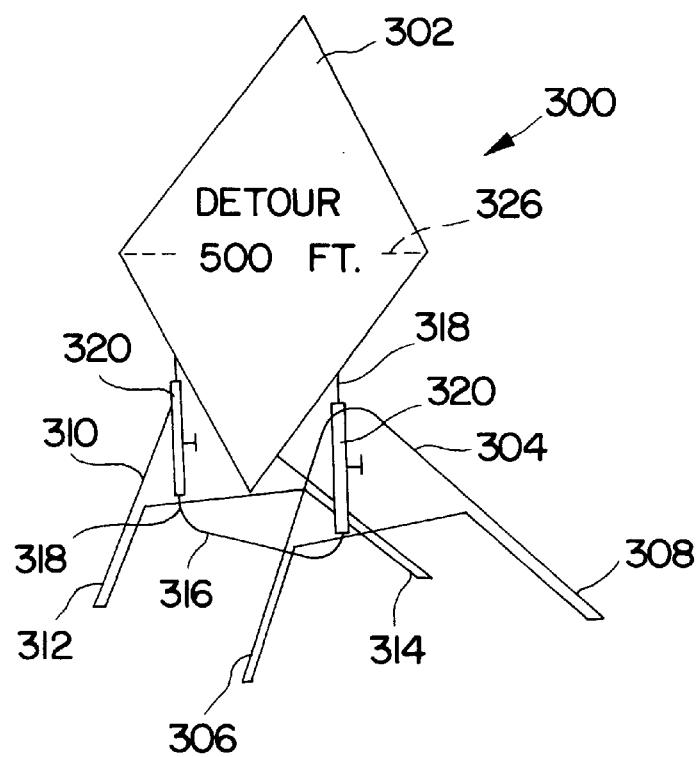
FIG. 16 is a schematic view of a sign stand which embodies the present invention.
Figure 17:
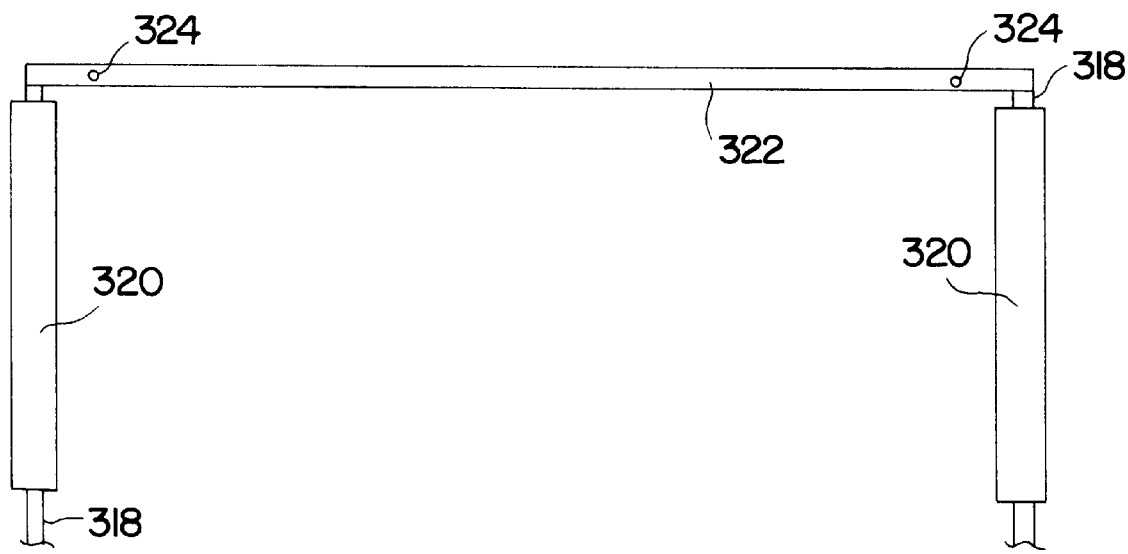
FIG. 17 is a partial side view of the sign stand without the sign attached thereto.
Figure 20:
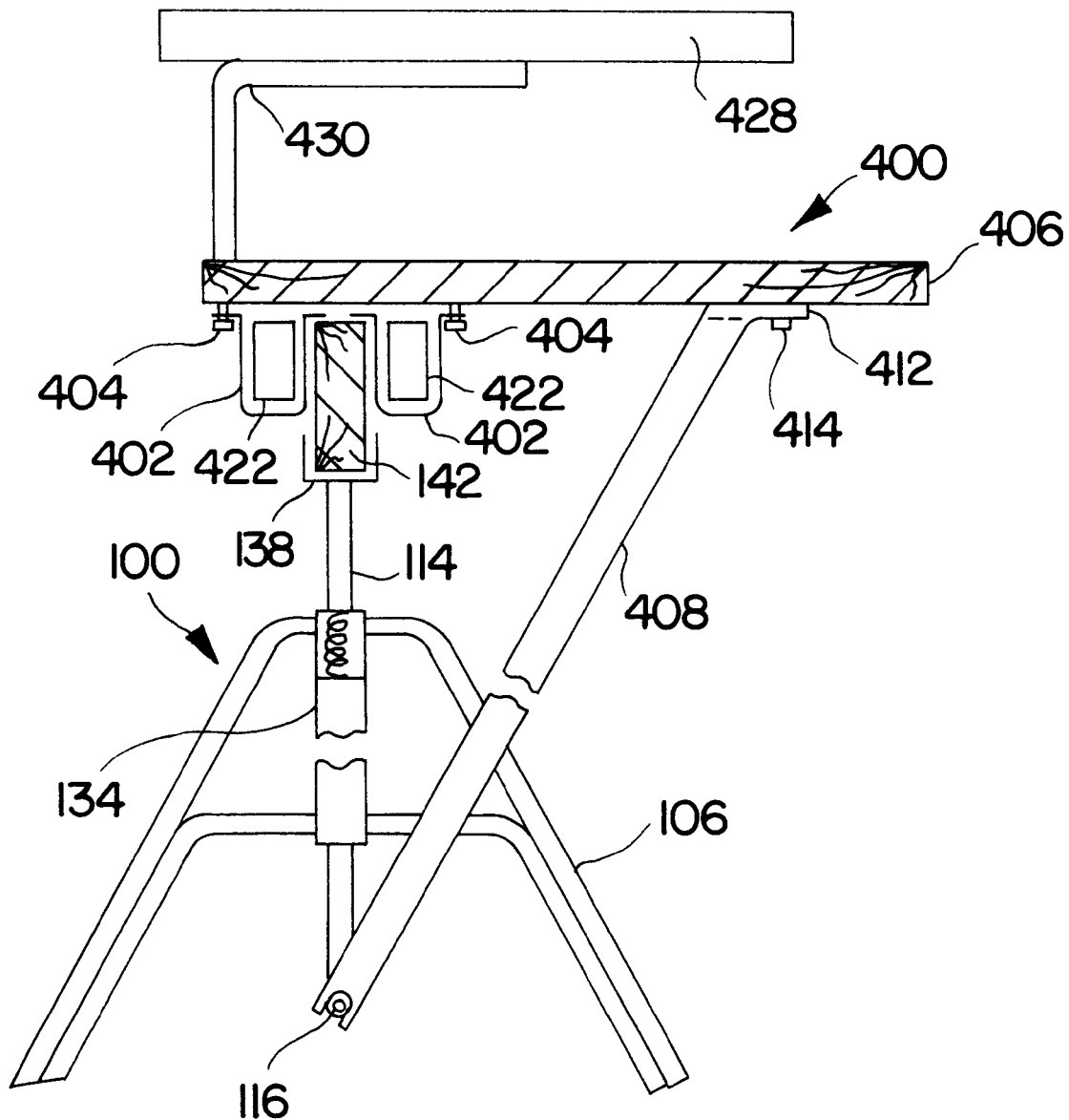
FIG. 20 is a sectional view, partly schematic, taken along lines 20—20 of FIG. 18.

Referring to FIGS. 16 and 17, there is shown at 300 a portable temporary roadside sign stand to which a sign 302 is attached. Like the sawhorse 100, the stand 300 includes a first frame 304 having a first pair of legs 306 and. 308, a second frame 310 having a second pair of legs 312 and 314, and a third frame 316 having a pair of vertical portions 318 slidably and rotatably received in sleeves 320 which are welded or otherwise suitably attached to the respective frames 304 and 310. Thus, like the sawhorse 100, each side of the sign stand 300 is independently height adjustable to allow for unlevel terrain, and the sign stand 300 is similarly foldable to a compact shape for stowage and transport.

The rear legs 308 and 314 have increased length to provide a larger footprint for greater stability.

Welded or otherwise suitably attached at its ends to the upper ends of vertical frame portions 318 is an elongate plate 322 which has two or more threaded apertures 324 horizontally therethrough for receiving screws for attachment of the sign 302. Thus, not only may apparatus according to the present invention serve as a sawhorse to support workpieces, but it may also serve to support signs and other objects.

The sign 302 may be of a type which is foldable such as along dashed lines 326 so that the top half lies alongside the bottom half thereof so that the sign stand 300 with the sign attached may be easily and quickly folded to a compact configuration for stowage and transport.

Referring to FIGS. 18 to 23, there is shown at 400 a miter saw accessory unit which may be used with the sawhorse 100. The unit 400 includes a pair of elongate flanged channel members 402 which are attached such as by a plurality of screws 404 to the underside of a piece of plywood 406 or other support member. The support member 406 may have a width of between about 12 and 24 inches, for example, perhaps about 15 inches, as compared to a width of perhaps about 1½ inches for beam 142. In order to suitably support member 406, the channel members 402 are spaced apart a distance which is slightly greater than the width of beam 142, and beam 142 is snugly nested between the channel members 402. Further, the cantilevered side of board 406 is braced by suitable means such as a channel member 408 positioned centrally of the sawhorse length. As seen in FIG. 23, the lower end of brace 408 has a cut-out 410 in which sawhorse frame portion 116 is received. As seen in FIG. 22, a clip or catch 412 is suitably attached such as by perhaps two screws 414 to the underside of board 406 and is stamped and bent to have a portion 416 which is slightly spaced from the undersurface of the board 406. Brace 408 is formed to have a cut-out 418 in its upper end portion which provides a tongue portion 420 which is received between the clip portion 416 and the board 406 to secure the brace 408 in position.

Slidably disposed within channels 402 are elongate channel members 422 which slide out from opposite ends of the assembly 400, as illustrated in FIG. 18. When extended, each channel 422 is pressed against the board 406 to hold it in place by suitable means such as set screw 424 which threadedly engages nut 426 which is welded about an aperture (not shown, in the channel 402 and thereby applies force to channel 422.

The outer ends of channels 422 support lumber support members 428, which are composed of wood or other suitable material, from respectively opposite ends of the board. The lumber support members 428 are height adjustable as follows to adjust to various brands of miter saws on the board 406. A bracket 430 has two portions 432 and 434 which are normal to each other. As best seen in FIG. 21, bracket portion 432 is attached to channel 422 by means of set screw 436 which is received in a longitudinal slot 438 in bracket portion 432 and threadedly engages a threaded aperture in the outer wall of channel 422. Sheet steel formations 440 welded to the channel 422 define a slot for positioning and maintaining the bracket portion 432 in a vertical orientation, i.e., they restrict canting movement of bracket portion 432 to one side or the other. Bracket portion 434 is attached to support member 428 by a pair of screws 442 which are received in apertures (not shown) in bracket portion 434 and threadedly enter the undersurface of support member 428. The longitudinal slot 438 is oriented vertically for use of the assembly and allows vertical adjustment by loosening set screw 436, moving the bracket portion 432 up and down between formations 440 until the desired support member height is attained, then tightening the set screw 436.

Each of the formations 440 has a centrally disposed slot 446 the floor of which is spaced from channel 422, as illustrated at 448. The two slots 446 are in alignment with each other. In order to fold up the unit 400, the set screw 436 is loosened, the bracket portion 432 removed from the slot between the formations 440, turned 90 degrees to a horizontal orientation, and inserted to lie horizontally in the aligned slots 446, spaced from the channel 422 by the distance 448 and with the bracket portion 434 and support member 428 extending horizontally therefrom toward the other side of board 406. The set screw 436 is then tightened to hold the bracket 430 in this position. The set screw 424 may then be loosened and the channel 422 slid back within the respective channel 402. The left side of FIG. 19 shows the leftward extending channel 422 fully inserted, while the rightward extending channel is shown not fully inserted. The platform 406 may have a length of perhaps 42 inches. If the length of platform were increased by perhaps another 6 inches without otherwise changing the assembly, the support pieces 428 may be slidable underneath the platform 406. Since the distance 448 is greater than the thickness of the outer wall of the channel 402, the bracket portion 432 passes along the exterior of channel 402 so that the outer wall of channel 402 is sandwiched between the channel 422 and the bracket portion 432. Set screw 424 may then be tightened to secure the channel 422 in position.

After the brace 408 is removed, the accessory unit 400 may be easily lifted from the sawhorse 100 for stowage and transport. The accessory unit 400 may be quickly and easily mounted to the sawhorse 100 for use of a miter saw.

Figure 25:
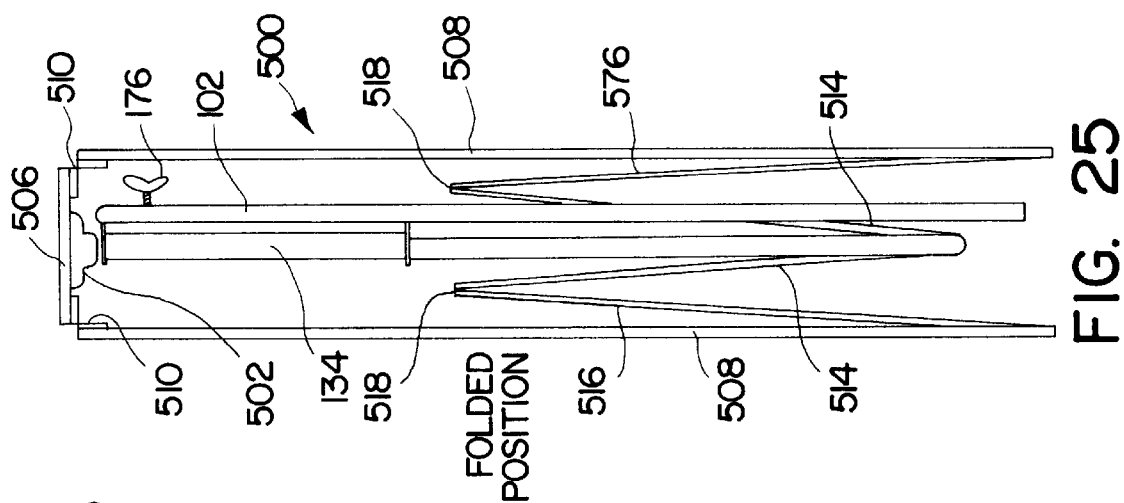
FIG. 25 is a view similar to that of FIG. 24 of the table in a folded configuration for stowage.
Figure 24:
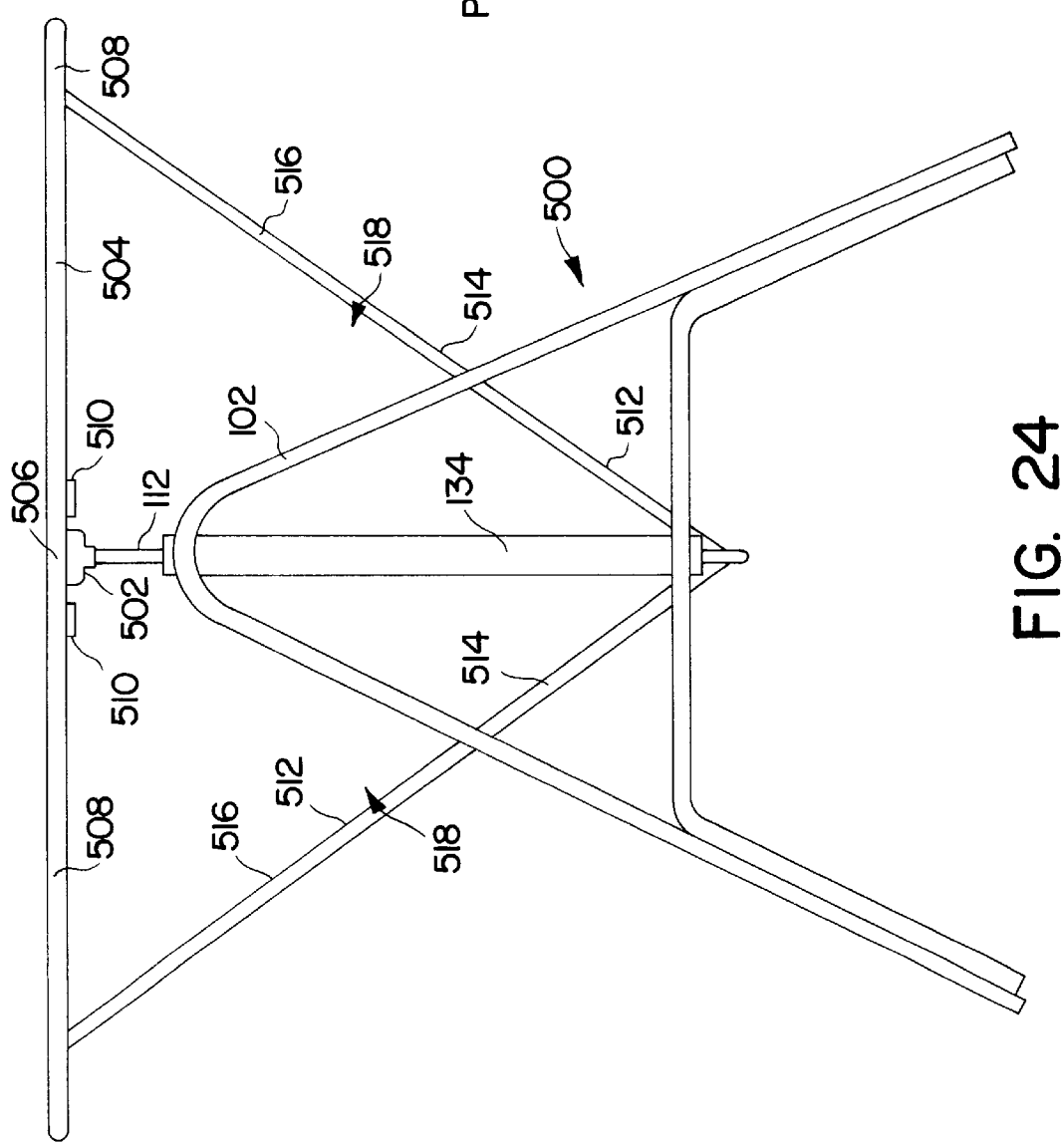
FIG. 24 is a side elevation view, partly schematic, of a table, which embodies the present invention, unfolded for use.

Referring to FIGS. 24 and 25, there is shown generally at 500 a portable and foldable table using the principles of the present invention. An elongate stringer 502 is suitably attached at its end portions to the upper ends of frame portions 112 and 114. A narrow central portion 506 of a table top 504 is suitably attached to the upper surface of stringer 502. A pair of leaves 508 of the table top 504 are hingedly connected to the central portion 506 as illustrated by hinges 510. Braces 512 extend from the frame horizontal portion 116 to the outer edge portions of the leaves 508. Each brace 512 comprises a pair of portions 514 and 516 connected by a hinge, illustrated at 518. FIG. 25 illustrates the table 500 folded wherein the frames 102 and 106 have been rotated 90 degrees so that the legs are coplanar, the braces 512 folded at hinges 518, and the table top leaves 508 are folded at hinges 510 to lie alongside the coplanar frames 102 and 106 and the frame 110.

It should be understood that, while the present invention has been described in detail herein, the invention can be embodied otherwise without departing from the principles thereof, and such other embodiments are meant to come within the scope of the present invention as defined by the appended claims.

What is claimed is:

1. Apparatus comprising a first frame having a first pair of legs, a second frame having a second pair of legs, a third frame including first and second elongate portions connected to said first and second frames respectively, each of said elongate portions having an upper end portion and a lower end portion, a support member connected to said upper end portions of said first and second elongate portions, said third frame further including a third elongate portion extending between and interconnecting said lower end portions of said first and second portions, means for adjusting a distance which said first elongate portion extends beyond said first frame to said support member, and means for rotating said first and second frames relative to said first and second elongate portions respectively.

2. Apparatus according to claim 1 further comprising means for adjusting a distance which said second elongate portion extends beyond said second frame to said support member.

3. Apparatus according to claim 1 further comprising a pair of sleeves connected to said first and second frames respectively, said first and second elongate portions received within said sleeves respectively, said distance adjusting means comprising means for adjusting position of one of said sleeves along the length of said first elongate portion, and the apparatus further comprises means for adjusting position of the other of said sleeves along the length of said second elongate portion.

4. Apparatus according to claim 3 wherein at least one of said position adjusting means comprises at least one washer having a tab portion, means defining a slot in said respective sleeve, said respective elongate portion received in said washer, said tab portion received in said slot, and means for spring biasing said washer in a position skewed to said respective elongate portion to hold said respective sleeve in a fixed position relative to said respective elongate portion whereby the respective sleeve is releasable from the fixed position for movement along the length of the respective elongate portion by pressing on the tab portion to release the washer from the skewed position.

5. Apparatus according to claim 4 wherein said at least one position adjusting means further comprises a screw attached to said respective sleeve for engaging said respective elongate portion to prevent relative movement between said respective sleeve and said respective elongate portion.

6. Apparatus according to claim 3 wherein at least one of said sleeves comprises a first wall, a pair of second walls generally normal to said first wall whereby said at least one sleeve partially surrounds said respective elongate portion, and a pair of end walls normal to said first wall and each of which has means defining an aperture for receiving said respective elongate portion.

7. Apparatus according to claim 6 wherein at least one of said position adjusting means comprises at least one washer having a tab portion, means defining a slot in said respective first wall, said respective elongate portion received in said washer, said tab portion received in said slot, a spring disposed about said respective elongate portion between one of said end walls and said washer for biasing said washer in a position skewed to said respective elongate portion to hold said respective sleeve in a fixed position relative to said respective elongate portion whereby said respective sleeve is releasable from the fixed position for movement along the length of said respective elongate portion by pressing on the tab portion to release the washer from the skewed position.

8. Apparatus according to claim 6 wherein said at least one sleeve comprises a stamped and pressed sheet metal member.

9. Apparatus according to claim 1 wherein at least one of said first and second frames comprises at least one bent tubular member and said third frame comprises a bent tubular member.

10. Apparatus according to claim 1 wherein one of said legs of said first pair of legs is longer than the other leg thereof, and one of said legs of said second pair of legs is longer than the other leg thereof.

11. Apparatus comprising a first frame including a first pair of legs, a second frame including a second pair of legs, a third frame including first and second elongate portions connected to said first and second frames respectively, each of said elongate portions having an upper end portion and a lower end portion, means defining a supporting surface connected to said upper end portions of said first and second elongate portions, said third frame further including a third elongate portion extending between and interconnecting said lower end portions of said first and second portions, means for rotating said first and second frames about vertical axes relative to said first and second elongate portions respectively whereby the apparatus is foldable so that said first and second pairs of legs are in a common plane and for adjusting a distance which each of said first and second elongate portions extends beyond said first and second frames respectively to said supporting surface means.

12. Apparatus according to claim 11 wherein said rotating and adjusting means comprises first and second sleeves attached to said first and second frames respectively for receiving said first and second elongate portions respectively.

13. Apparatus according to claim 12 wherein at least one of said first and second sleeves comprises a stamped and pressed sheet metal member.

14. Apparatus according to claim 11 wherein at least one of said first and second frames comprises at least one bent tubular member and said third frame comprises a bent tubular member.

15. Apparatus according to claim 1 wherein said third frame is a single piece.

16. Apparatus comprising a first frame having a first sleeve and a first pair of legs, a second frame having a second sleeve and a second pair of legs, a third frame including first and second elongate portions slidingly receivable within said first and second sleeves respectively and each of which has upper and lower end portions, means for releasably locking said first and second sleeves at selected positions along the lengths of said first and second elongate portions respectively, means including a third elongate portion of said third frame for interconnecting said lower end portions of said first and second elongate portions, and means defining a support surface interconnecting said upper end portions of said first and second elongate portions.

17. Apparatus according to claim 16 further comprising means for rotating said first and second frames relative to said first and second elongate portions respectively.

18. Apparatus according to claim 16 wherein said third frame is a single piece.

* * * * *